March 8, 1960 G. R. HUISMAN ET AL 2,927,623
COMPOSITE SHEET FABRICATING APPARATUS AND METHODS
Filed April 30, 1956 2 Sheets-Sheet 1
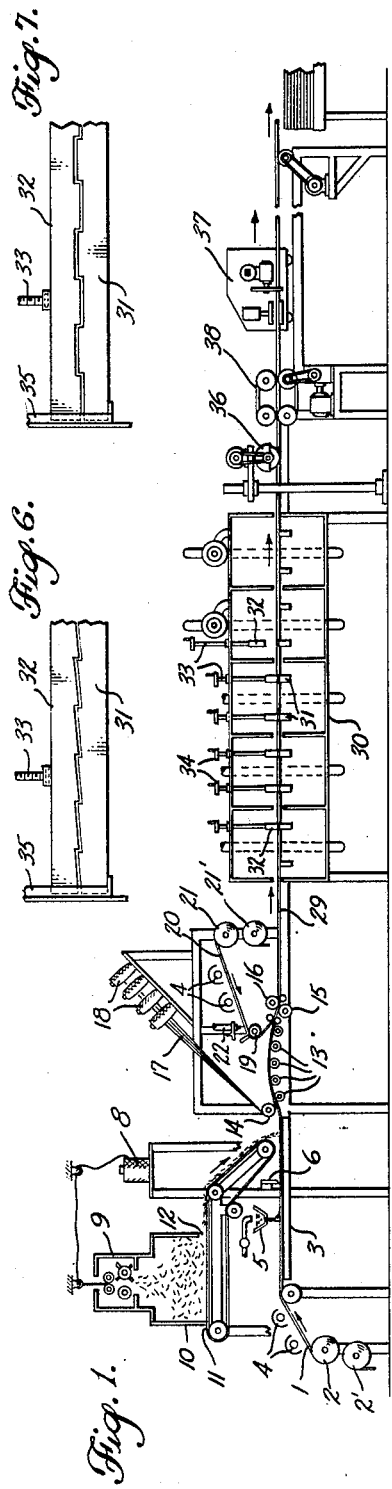
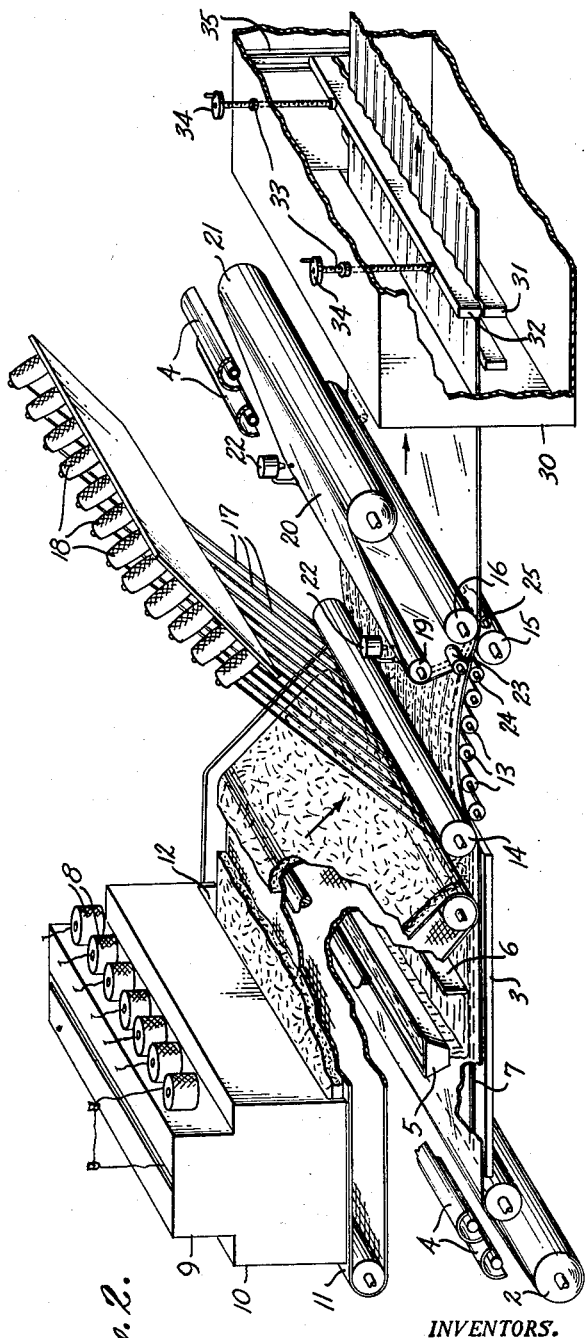
INVENTORS.
CALHOUN SHORTS
GEORGE R. HUISMAN
BY
Reynolds, Beach & Christensen
ATTORNEYS

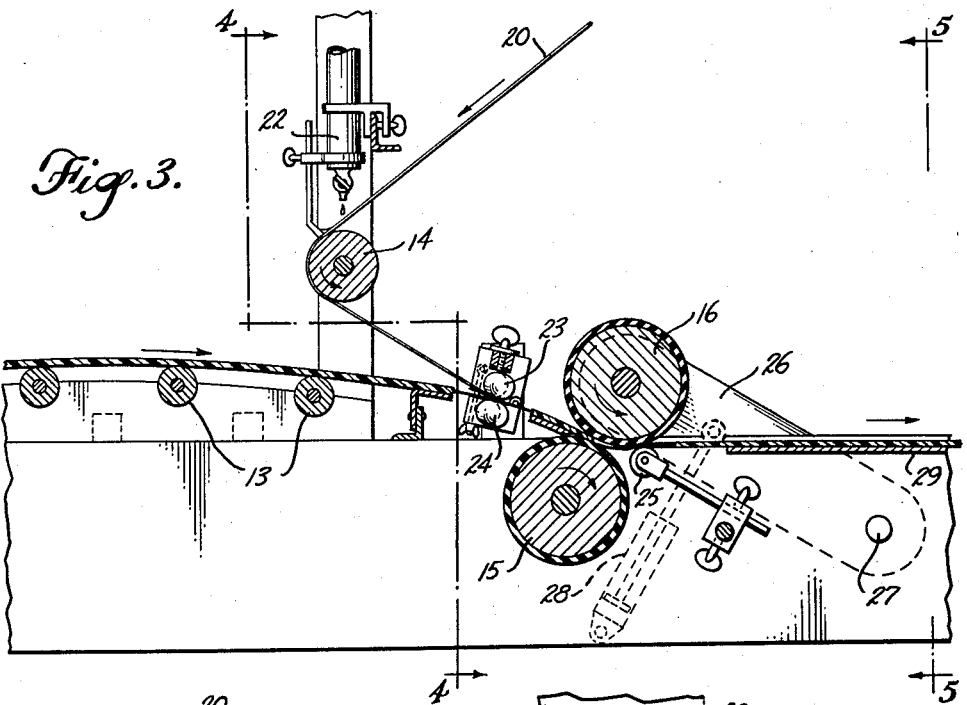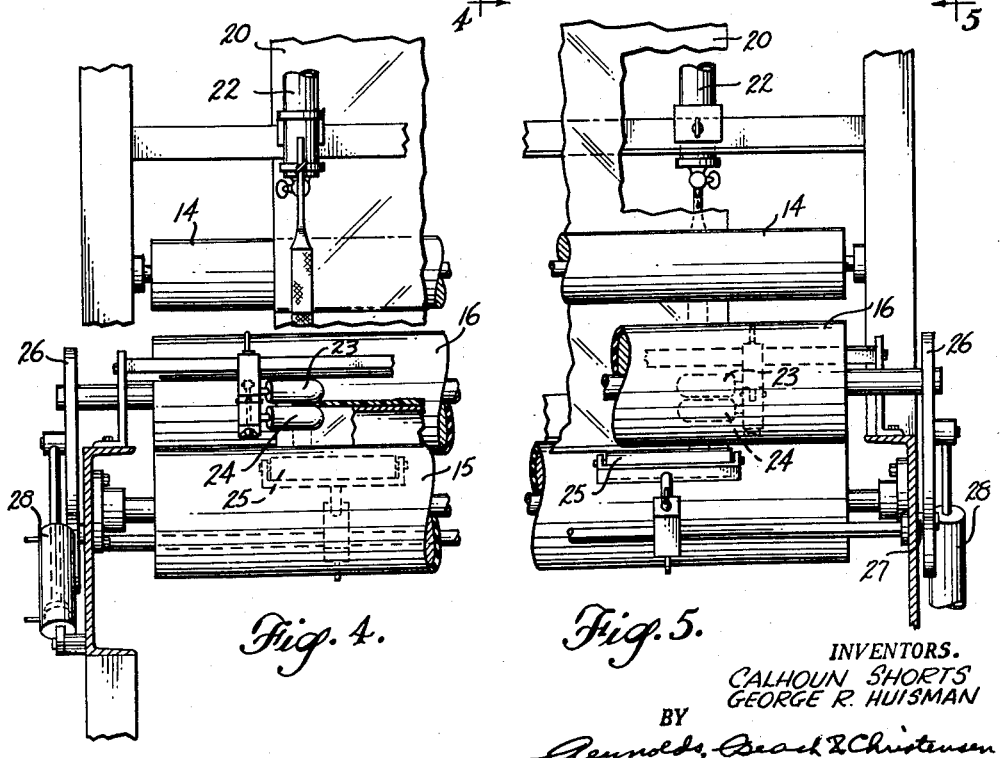

United States Patent Office 2,927,623
Patented Mar. 8, 1960

2,927,623

COMPOSITE SHEET FABRICATING APPARATUS AND METHODS

George R. Huisman, Los Angeles, Calif., and Calhoun Shorts, Bellevue, Wash., assignors to Filon Plastics Corporation, El Segundo, Calif., a corporation of California Application April 30, 1956, Serial No. 581,432

11 Claims. (Cl. 154—1.7)

This invention relates to a method and apparatus for fabricating composite sheet material incorporating fibrous reinforcing material embedded in set resin. Sheet material of this general character is not broadly new, although the type of fibrous reinforcing material and the method of incorporating it in the sheet constitutes a part of the present invention.

A principal object of this invention is to utilize loose fiber material composed of short strands as the reinforcing material in fabricating sheets of the type mentioned above. In this connection it is also an object to provide apparatus capable of preparing and handling such loose material and incorporating it in the resin in a uniform manner prior to setting of the resin.

More specifically, it is an object to place the resin and loose fibrous reinforcing material between surface sheets which confine the reinforcing material and resin during setting of the resin after which the surface sheets may be stripped off the completed composite sheet.

A particular object is to compact the loose fiber, embed it in resin and hold the fiber and resin in this condition on a carrier surface sheet while a cover surface sheet is being applied. The entire assembly is then compressed to the desired thickness, but prior to such compression step the edges of the carrier and cover surface sheets are secured together so that such surface sheets form a flat tube confining the loose reinforcing fiber and resin.

An additional object is to produce composite sheets of resin and fibrous reinforcing material having any of various cross-sectional configurations and predetermined thickness.

It is a further object to produce a composite sheet of the type mentioned by a continuous and virtually automatic process.

In general the foregoing objects may be accomplished by feeding through a fabricating machine a carrier surface sheet of cellulose film such as cellophane, onto which a measured quantity of settable resin in liquid form is deposited and spread evenly by a doctor blade. The edge portions of this sheet are raised so as to confine the resin to the central portion of the sheet. Chopped strands of fibrous material are fed onto the resin and simultaneously compacted and pressed into the resin by a plurality of threads extending lengthwise of the sheet. As the loose fiber is held compacted by such threads, the cover surface sheet is laid on the resin and fiber mixture, the opposite edges of the surface films are glued together to form a flat tube containing the resin and fiber mixture, and such composite sheet is passed between rolls to squeeze out the air and establish the thickness of the sheet. The sheet thus formed is then passed through slots of fixed width during setting of the resin, which preferably is expedited by passing the sheet through an oven. After the resin has set, the longitudinal edges of the continuous sheet may be trimmed, and the sheet cut to desired lengths. Such apparatus is shown in greater detail in the accompanying drawings.

Figure 1 is a diagrammatic side elevation view of the complete composite sheet fabricating apparatus.

Figure 2 is a top perspective view showing somewhat diagrammatically the apparatus for initially forming the composite sheet of corrugated cross section, parts being broken away.

Figure 3 is a longitudinal sectional view through a portion of the sheet fabricating apparatus; Figure 4 is a fragmentary transverse sectional view through the apparatus taken on line 4—4 of Figure 4, parts being broken away; and Figure 5 is a fragmentary transverse sectional view taken on line 5—5 of Figure 3, parts being broken away.

Figure 6 is a cross-sectional view through the oven having strips for forming a sheet of sawtooth cross section and Figure 7 is a similar view showing strips for forming a sheet of alternately reversed channel cross section.

In the past composite sheets have been made from resin having reinforcing material embedded in it, and a method and apparatus for producing such sheets are disclosed in the companion application of Calhoun Shorts, Serial No. 312,819, filed October 2, 1952, entitled Sheet Forming Apparatus and Process issued March 12, 1957 as Patent No. 2,784,763. The product made by such apparatus and process, however, incorporated reinforcing material initially of sheet type, such as a woven fabric or a resin bonded mat of stranded material. The product made by the present apparatus and method is generally comparable in physical characteristics and can be made considerably more economically by the use of loose fibrous material rather than sheet material for reinforcing purposes.

The general characteristics of the apparatus and process will be illustrated by reference to the diagrammatic illustation of Figure 1. A lower carrier sheet 1 is unrolled from a roll 2 and pases along a table 3. Such material may be of a paper or plastic of a character which can be stripped from the completed composite sheet product and conveniently may be a cellulose film such as cellophane. If the surface sheet material is shrunk by heat as cellophane is, it will be passed through a heating zone prior to material being placed on the surface sheet. In this zone heat to shrink the surface sheet may be supplied by heat lamps 4 of the infrared type. In order to prevent objectionable further shrinking of the surface sheets subsequently, the heat to which they are subjected by the heat lamps must raise their temperature to a value at least as high as the temperature to which they will be subjected later during setting of the resin.

On the shrunk carrier sheet 1 a measured quantity of resin is deposited continuously from a trough 5. This resin may be deposited in liquid form either only in the central portion of the sheet or distributed across the sheet in a zone a substantial distance inward from the longiturinal edges of the sheet. In either case the resin is spread uniformly across the sheet to a width substantially equal to the width of the finished composite sheet by a doctor blade 6. The liquid resin is kept from running off the sheet by raising such sheet edges. The means utilized to lift the sheet edges may be simply upturned sides on the edges of table 3, or may be edge ridges such as formed by a bar 7 along each edge of the table 3.

The resin used for making such sheet material can be of the epoxy or polyester type, for example, which contains accelerator or catalytic material which will cause it to set either by exposure to air or by being heated, by further polymerization action. The character of such resins and the technique of using them are well known to persons working in the plastics field. In general their physical characteristics are such that these resins produce a hard, transparent or translucent product by polymerization, but in order to provide toughness and strength, fibrous reinforcing material must be embedded in such resins. In a sheet four feet wide, eight feet long and one-sixteenth of an inch thick, for example, thirty percent of the sheet by weight can be reinforcing material and seventy percent resin, although the proportions of resin and fiber can be varied considerably.

The fibrous reinforcing material can be any of various kinds of synthetic or inorganic fibers, or vegetable fibers, or animal fibers. A preferred type of fiber, however, is glass fiber. For the sake of economy the fiber used in the present sheet fabrication process is in the form of strands approximately two inches in length. The fibrous material may be procured in the form of spools or rolls of fiber rovings 8, and this material is unwound from the spools and fed through a conventional chopping machine 9, which chops the roving material into strands of the desired length. The chopped strands drop through a box 10 onto a belt 11, which carries the fiber into a position for depositing it onto the carrier film sheet 1.

The amount of fiber removed from the box 10 through the opening 12 by the belt 11 is controlled by the speed of the chopping machine and the number of rovings fed to it. The fiber withdrawn by the belt 11 from the box is in the form of a loose stack which is distributed substantially uniformly across the width of the belt and deposited onto the layer of resin being carried by the lower sheet 1.

From the flat table 3 the sheet 1 travels over arcuate supporting means shown as formed of rollers 13, the axes of which are arranged in an upwardly bowed arc. While such rollers are preferred, the arcuate supporting means could be an endless belt either of the idling type or positively driven, a portion of the periphery of a large drum, or simply a stationary flat plate. Whatever type of arcuate supporting and guiding means is used, the arc should be of sufficiently small radius so that the length of arc defined by the supporting means is appreciably greater than the chord subtending such arc.

At the leading end of the arcuate supporting means is a roller 14 and at the discharge end or trailing end is a pair of compression or squeeze rollers including a lower roller 15 in advance of a cooperating upper roller 16, sufficiently so that the axes of the rollers 15 and 16 lie substantially in a plane disposed radially of the arcuate supporting means composed of rollers 13. Tensioned threads 17 extend from spools 18 mounted above the sheet support down around roller 14, over the upper side of the pile of fibers carried by the carrier sheet 1, and between the rollers 15 and 16. Sufficient tension is placed on each of the spools 18 so that the threads extending circumferentially over the arched supporting means will be pressed down against the fiber to compact it and press it into the resin on the carrier sheet 1. While the number of threads 17 provided for this purpose is not critical, it should be sufficient so that the threads are spaced closely enough to compress the fiber pile to a substantially uniform thickness.

Ahead of the squeeze rolls 15 and 16 is mounted a guide roll 19 around which a cover sheet 20 of paper or synthetic film material similar to the material of the carrier sheet 1 is passed. This cover sheet material is dispensed from a roll 21 located sufficiently forwardly of roll 19 to allow room for the heaters 4 and to enable a ribbon of glue to be dropped along each side of the cover sheet 20 by glue dispensers 22. The surface of this cover sheet on which the glue is deposited becomes the under surface of the cover sheet as it passes about roll 19. The edge portions of this cover sheet pass beneath short rolls 23 cooperating with lower rolls 24 to squeeze together the edge portions of the upper surface sheet 20 and the lower surface sheet 1 outwardly of the resin and pile of fibers. The glue is of quick-setting type so that it will be set between the time it is deposited on the surface of sheet 20, passes through squeeze rolls 23 and 24, and reaches the larger squeeze rolls or compression rolls 15 and 16.

At the time that the upper surface sheet 20 and the lower surface sheet 1 reach the rolls 15 and 16, therefore, with their edge portions stuck together, they form a flattened tube which contains the resin, the loose reinforcing fiber material and the threads 17 depressing the loose fiber material into the resin. As the composite sheet, composed of the flattened tube formed by the two edge-sealed surface sheets, and the fiber, the resin and the threads 17 in such tube, passes between the squeeze rolls 15 and 16, therefore, the air is squeezed out from the resin and fiber mass and the composite sheet is reduced to a predetermined thickness. Small rollers 25 press the margins of the flattened tube against the upper squeeze roll 16 thereby confining the liquid resin to the area within the tube occupied by the reinforcing fiber. Because the upper squeeze roll 16 is offset forward of the lower squeeze roll 15 as shown in Figure 3, such small rollers 25 may press the tube margins upward against roll 16 without displacing such margins appreciably from the plane of the sheet at the discharge side of rolls 15 and 16.

As the composite sheet passes between the pressure rolls 15 and 16, substantially the ultimate thickness of the composite sheet will be established, subject to whatever slight variation in thickness may be produced by shrinkage of the resin in setting. Such control of sheet thickness is established by mounting the support for roll 15 stationarily and mounting roll 16 yieldingly. The yielding support for roll 16 may include swinging arms 26 supported on pivots 27. These arms are held resiliently down by resilient means such as cylinders 28 which may be pneumatic cylinders, or cylinders containing compression springs, for example. The arms 26 will be urged against stops to limit the movement of roll 16 toward roll 15 to afford the desired spacing between them, but if some incompressible object should pass between the rolls, the upper roll will yield so that the apparatus will not become jammed. Moreover, if the cylinder 28 is of the double-acting pneumatic type, it may be operated to swing arm 26 upward sufficiently to enable the sheets 1 and 20 initially to be fed through the space between rolls 15 and 16 easily.

After the desired thickness of the composite sheet has thus been established, it will pass over a supporting table 29 into the oven 30 which will set the resin by polymerization. During its passage through the oven the sheet may be formed into a cross-sectional shape of any desired cross section. This forming operation is accomplished by passing the sheet between forming strips 31 and 32 of complemental contour. Pairs of these strips may be located a few feet apart and the width of the strips in the direction of travel of the sheet may be of the order of one inch. The lower strips 31 are fixedly mounted, and the upper strips 32 of each pair can be raised and lowered by suitable mechanism such as the screws 33 rotatable by hand wheels 34 adjacent to opposite ends of the upper strips. The hand wheels 34 may be interconnected for conjoint rotation so as to move the strip 32 vertically as a unit.

The cross-sectional contour given to the sheet will depend upon the shape of the adjacent sheet ironing surfaces of the cooperating strips. If the adjacent surfaces of these strips are planar, the sheet will be flat, whereas if the strips are corrugated, as shown in Figure 2, the sheet will be held in corrugated shape of cross-section as the resin is being set, so that the ultimate shape will be corrugated. Alternate shapes of strips are shown in Figures 6 and 7, the adjacent surfaces of the strips shown in Figure 6 being of sawtooth shape and the adjacent surfaces of the strips shown in Figure 7 being of alternate channel or hat-shaped section. In any case the upper strip ends are received in and guided for vertical movement by guides 35. By passing the composite sheet through the slots between the strips of each pair, the sheet will be held in its desired shape for a sufficient portion of its travel through the oven so as to establish definitely the shape of cross-section. When the strip emerges from the oven it may be cut to the desired width by edge trim saws 36 and to the desired length by a traveling saw 37 after which the severed sheet sections are stacked.

In preparing the apparatus for operation the rolls 2 and 21 of surface sheet material are mounted and threaded through the apparatus. To facilitate this operation the roll 16 is raised and each of the upper forming strips 32 is raised. The ends of the surface sheets are passed between cooperating endless belts of a traction device 38 which is shown and described in greater detail in the application of Shorts Serial No. 312,819, mentioned above. When the ends of the surface sheets are properly gripped by this traction mechanism, the upper strips 32 are lowered by rotation of screws 33 until the desired spacing between them has been established. Roll 16 also is lowered to its sheet pressing position, and then the resin and fibrous material feed can be begun, and the surfacing sheets pulled through the apparatus.

To facilitate continuity of production without rethreading the apparatus, standby surface sheet material rolls 2' and 21' may be provided so that they can be suitably attached to the ends of the rolls 2 and 21 when they have been depleted. It then will become necessary to stop the machine for making a new set-up only when the roving rolls 8 or the thread spools 18 have been exhausted.

We claim as our invention:

1. The method of fabricating composite sheet material which comprises moving a carrier sheet generally horizontally, placing on such carrier sheet a pool of liquid polymerizable resin and loose fiber, pressing tensioned threads downward against the fiber for immersing the fiber in such liquid resin, thereafter placing on the fiber and resin an upper cover sheet, and squeezing the carrier sheet, the cover sheet and the resin and fiber therebetween and thereby establishing substantially the final thickness of the composite sheet.

2. The method of fabricating composite sheet material which comprises moving a carrier sheet generally horizontally, placing on such carrier sheet a pool of liquid polymerizable resin and loose fiber, moving the carrier sheet along an upwardly arched path, while the carrier sheet is moving along such upwardly arched path pressing downward on the fiber tensioned threads extending lengthwise of such path and thereby compacting the fiber and substantially immersing the fiber in such liquid resin, thereafter placing on the fiber and resin an upper cover sheet, and squeezing the carrier sheet, the cover sheet and the resin and fiber therebetween and thereby establishing substantially the final thickness of the composite sheet.

3. The method of fabricating composite sheet material which comprises placing on a generally horizontal carrier sheet a pool of liquid polymerizable resin and loose fiber, moving the carrier sheet along an upwardly arched path, while the carrier sheet is moving along such upwardly arched path stretching over such path and pressing downward onto the fiber and resin a plurality of threads extending lengthwise of the carrier sheet and spaced transversely thereof and substantially immersing the fiber in the resin, moving such threads lengthwise in synchronism with the movement of the carrier sheet, placing over the threads, the fiber held by the threads and the resin an upper cover sheet, and squeezing the carrier sheet, the cover sheet and the resin, fiber and threads therebetween and thereby establishing substantially the final thickness of the composite sheet material.

4. The method of fabricating composite sheet material which comprises moving a carrier sheet generally horizontally, placing on such carrier sheet a pool of liquid polymerizable resin, depositing on such resin loose fiber, pressing downward on the loose fiber tensioned threads extending lengthwise in the direction of movement of the carrier sheet and thereby substantially immersing the fiber in such liquid resin, thereafter placing over the threads, fiber and resin an upper cover sheet, and squeezing the carrier sheet, the cover sheet, the resin and the fiber and thereby compacting the composite sheet.

5. In the method of fabricating composite sheet material, moving a carrier sheet generally horizontally, placing on such carrier sheet a pool of liquid polymerizable resin, thereafter depositing on such resin loose fiber, and pressing downward on the fiber tensioned threads extending lengthwise in the direction of movement of the carrier sheet and thereby substantially immersing the fiber in such liquid resin.

6. Apparatus for fabricating composite sheet material comprising means moving a carrier sheet along a predetermined generally horizontal path, means depositing a pool of liquid resin on such sheet, means depositing loose fiber on the resin, means laying a plurality of threads on the fiber extending lengthwise in the direction of movement of the carrier sheet, and means tensioning said threads and pressing them downward against the fiber and thereby substantially immersing the fiber in the liquid resin.

7. Apparatus for fabricating composite sheet material comprising means moving a carrier sheet along a predetermined generally horizontal path, means depositing a pool of liquid resin on such sheet, fiber depositing means, and a carrier belt receiving thereon loose fiber from said fiber depositing means to form a mat, disposed in position overlying and inclined downwardly toward the carrier sheet into a location in close proximity thereto and transporting such loose fiber mat substantially to the carrier sheet and transferring it onto the liquid resin pool on the carrier sheet, means laying a plurality of threads on the fiber extending lengthwise in the direction of movement of the carrier sheet, and means tensioning said threads and pressing them downward against the fiber and thereby substantially immersing in the liquid resin the fiber deposited thereon from said carrier belt.

8. Apparatus for fabricating composite sheet material comprising means operable to move a lower carrier sheet along a predetermined generally horizontal path, means operable to deposit a pool of liquid resin on such sheet, means operable to deposit loose fiber on the deposited resin, upwardly arched supporting means operable to support the lower carrier sheet in upwardly arched condition lengthwise of its direction of movement beyond said resin-depositing means and said loose fiber depositing means, means operable to support a plurality of threads extending in tensioned condition lengthwise of the direction of movement of the sheet circumferentially of said upwardly arched supporting means to compact the fiber and substantially immerse the fiber in the liquid resin, and means operable while the fiber is thus held compacted by the threads to squeeze the threads, compacted fiber, resin and the lower sheet.

9. The apparatus defined in claim 8, in which the squeezing means includes upper and lower squeeze rolls mounted with their axes substantially in a plane extending radially of the arcuate supporting means and located at the discharge end of such arcuate supporting means.

10. Apparatus for fabricating composite sheet material comprising means operable to move along a predetermined generally horizontal path composite sheet material including surface sheets and liquid resin between such sheets, upper and lower squeeze rolls between which said first means moves such composite sheet material, said upper squeeze roll being offset forwardly in the direction of travel of the composite sheet material from said lower squeeze roll, and means located substantially directly beneath said upper squeeze roll and pressing marginal portions of such surface sheets firmly against said upper squeeze roll and thereby substantially excluding resin from the space between such edge portions of such surface sheets.

11. The apparatus defined in claim 10, in which the pressing means is a roller.

References Cited in the file of this patent

UNITED STATES PATENTS

| | | |
|---|---|---|
| 2,208,060 | Wagner | July 16, 1940 |
| 2,428,654 | Collins | Oct. 7, 1947 |
| 2,496,911 | Green | Feb. 7, 1950 |
| 2,577,205 | Meyer et al. | Dec. 4, 1951 |
| 2,637,673 | Barnard | May 5, 1953 |
| 2,692,220 | Labino | Oct. 19, 1954 |
| 2,704,734 | Draper et al. | Mar. 22, 1955 |
| 2,731,066 | Hogendobler et al. | Jan. 17, 1956 |
| 2,771,387 | Kleist et al. | Nov. 20, 1956 |
| 2,784,763 | Shorts | Mar. 12, 1957 |

FOREIGN PATENTS

| | | |
|---|---|---|
| 621,867 | Great Britain | Apr. 21, 1949 |